(No Model.) 4 Sheets—Sheet 2.
F. W. T. HARTLAND & A. MALPAS.
MOLDING MACHINE.
No. 572,656. Patented Dec. 8, 1896.
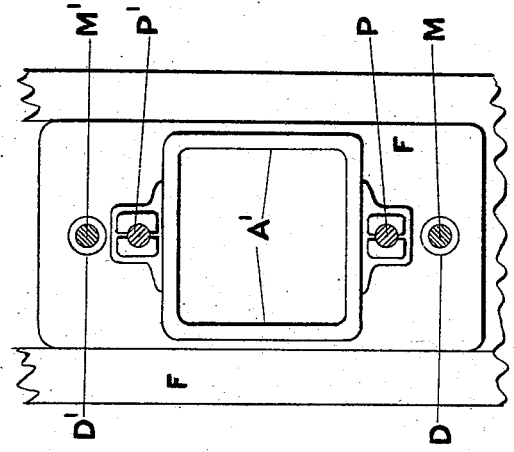
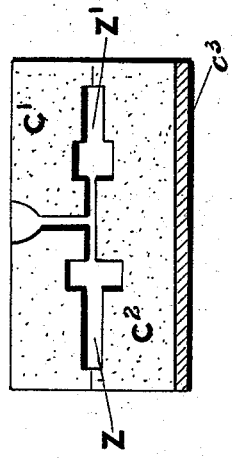
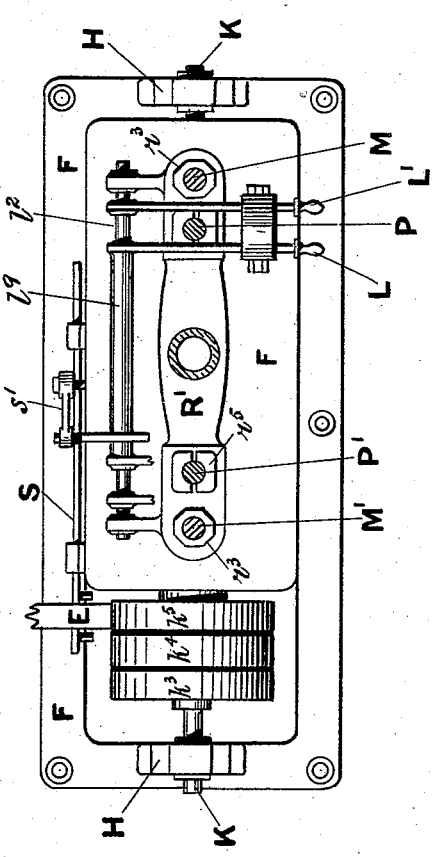
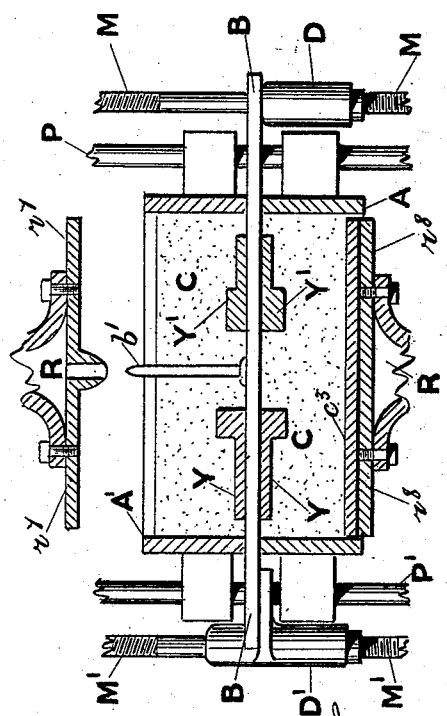
Witnesses
H. van Oldenneel
E. A. Scott
Inventors
Frederic William Thomas Hartland
Arthur Malpas
by
Attorneys (No Model.) 4 Sheets—Sheet 3.

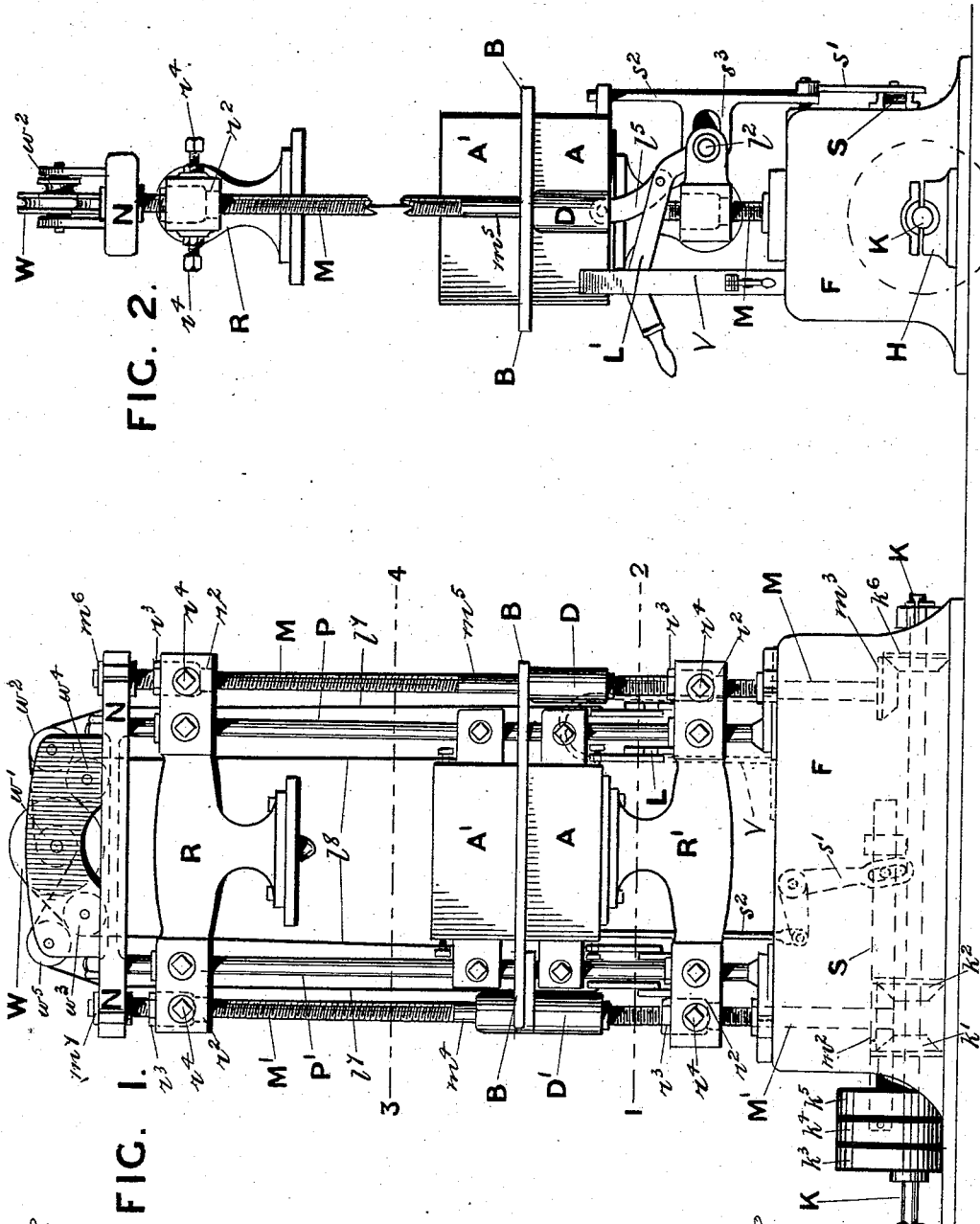

F. W. T. HARTLAND & A. MALPAS.
MOLDING MACHINE.

No. 572,656. Patented Dec. 8, 1896.

Witnesses
H. van Oedenneel
E. A. Scott

Inventors
Frederic William Thomas Hartland
Arthur Malpas
by
Attorney (No Model.) 4 Sheets—Sheet 4.

F. W. T. HARTLAND & A. MALPAS.
MOLDING MACHINE.

No. 572,656. Patented Dec. 8, 1896.

Witnesses
H. van Oldenneel
E. A. Scott

Inventors
Frederic William Thomas Hartland
Arthur Malpas
by
Attorneys

UNITED STATES PATENT OFFICE.

FREDERIC WILLIAM THOMAS HARTLAND AND ARTHUR MALPAS, OF WEST BROMWICH, ENGLAND.

MOLDING-MACHINE.

SPECIFICATION forming part of Letters Patent No. 572,656, dated December 8, 1896.

Application filed January 7, 1896. Serial No. 574,627. (No model.) Patented in England March 16, 1895, No. 5,578.

*To all whom it may concern:*

Be it known that we, FREDERIC WILLIAM THOMAS HARTLAND, iron-founder, of Boulton House, West Bromwich, in the county of Stafford, and ARTHUR MALPAS, patternmaker, of Pleasant Street, West Bromwich aforesaid, England, subjects of the Queen of Great Britain, have invented a certain new and useful Improved Molding-Machine, (for which Letters Patent were granted in Great Britain, No. 5,578, dated March 16, 1895,) of which the following is a specification.

Our invention has for its object an improved molding-machine which may be worked either by hand or by mechanical power, which in either case effects considerable economy in time and labor, besides insuring great exactness in manipulation and regularity in the castings produced.

In order that our invention may be clearly understood and more easily carried into practical effect, we have appended hereunto four sheets of drawings, upon which we have illustrated sufficient examples of our machine to enable others to adapt it to the various conditions met with in practice. It will also be understood that while the examples shown are assumed to be worked from an ordinary driving-shaft by driving-pulleys the operations may be accomplished through other means.

Figure 10:
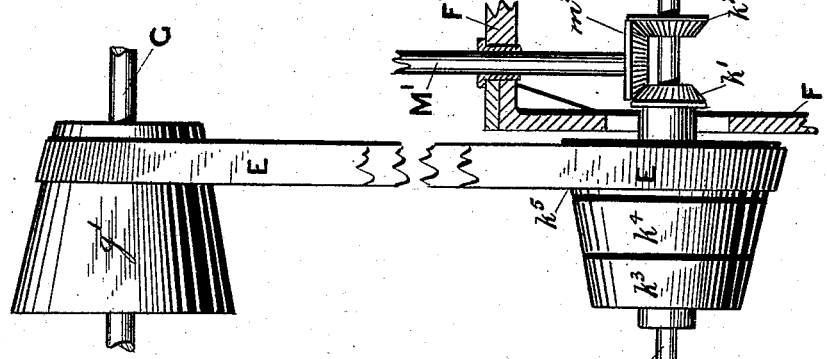
Figure 9:
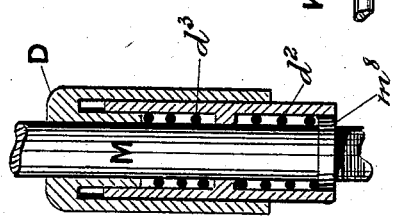
Figure 7:
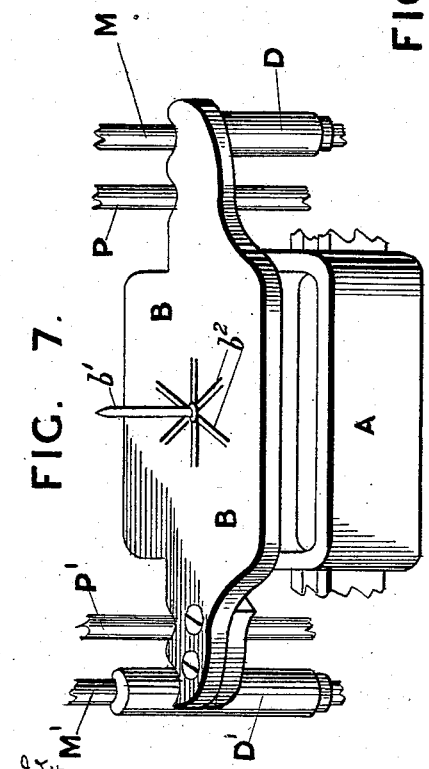
Figure 8:
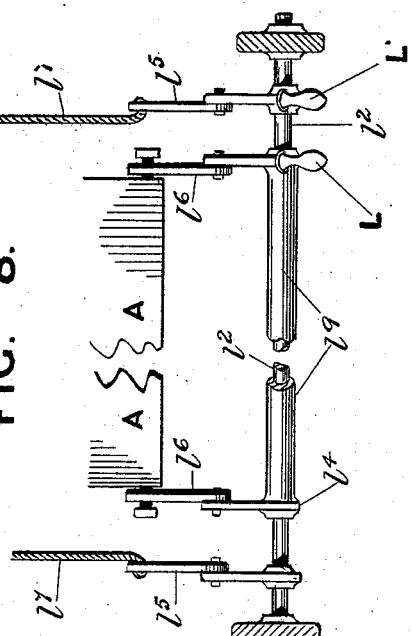
Figure 12:
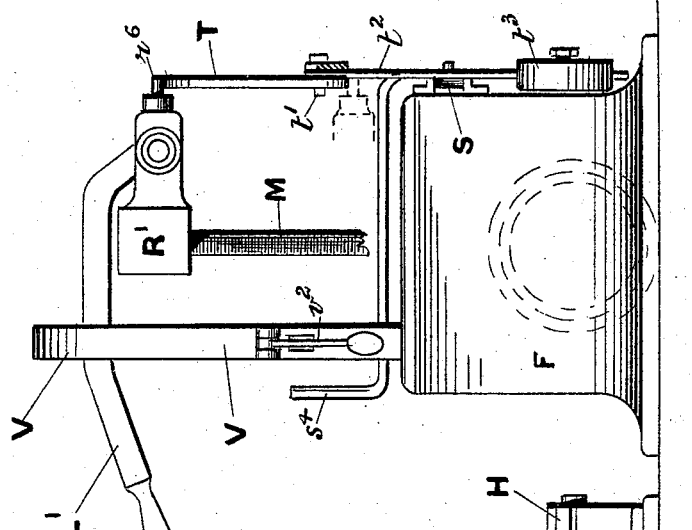
Figure 11:
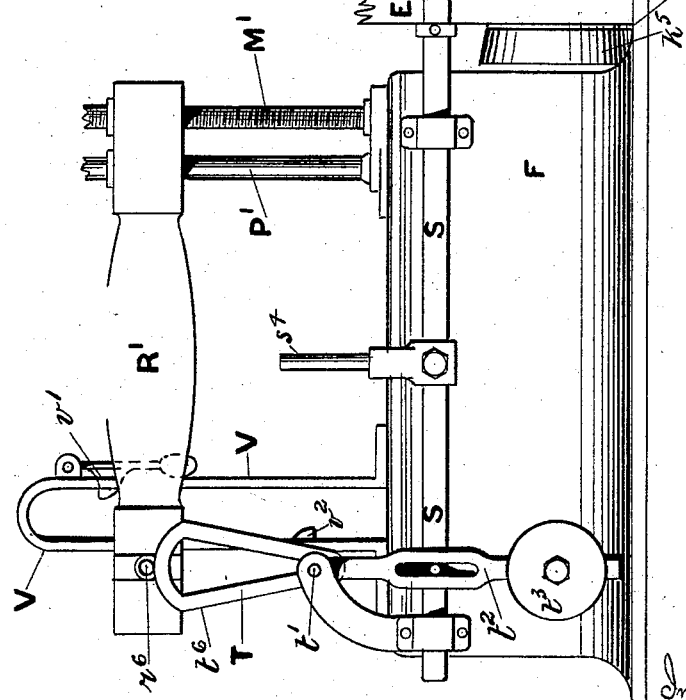

Figure 1 is a front elevation of our machine adapted to be driven from an ordinary driving-shaft. Fig. 2 is a side elevation of the machine, the screw-shaft M being broken off in two places to show the parts behind. Fig. 3 is a part sectional plan of the machine on the line 1 2 of Fig. 1. Fig. 4 is a part sectional plan of the top molding-box A' on the line 3 4 of Fig. 1. Fig. 5 is a broken-off part vertical section through the molding-boxes A and A' and pattern-plate B, showing the loose sand C ready for pressing and the patterns Y and Y' in position for forming the molds. Fig. 6 is the complete sand mold in its finished and compressed state removed from the boxes and ready to receive the molten metal, C' being the mold from the upper box A' and $C^2$ from the lower box A, Z and Z' representing the section of the molds produced from the patterns Y and Y'. Fig. 7 is a perspective view of the pattern-plate B with its gate $b'$ and sprays $b^2$ and with the upper box A' lifted away. Fig. 8 is a back view of the lever arrangement for separating the boxes. Fig. 9 is an enlarged vertical section of one of the lifting or spring bushes D. Fig. 10 is an alternative arrangement of the driving-gear. Fig. 11 is a part back view showing an alternative method for operating the driving-band E. Fig. 12 is a side or end view of Fig. 11.

The machine may be made to stand on its hollow bed F. The shaft K, which may be driven from any convenient motor or driving-shaft G, Fig. 10, is in the example shown hung in suitable plumber-blocks H and runs through the inside of the hollow bed F. The driving-shaft K carries two miter or bevel wheels $k'$ and $k^2$, gearing with the wheel $m^2$, fixed on the vertical screw-shaft M', and also the bevel-wheel $k^6$, gearing with $m^3$ on M. The wheel $k'$ runs loosely with the pulley $k^5$ on the shaft K, the pulley $k^3$ and wheels $k^2$ and $k^6$ being fixed to and revolving with the shaft K, while the pulley $k^4$ runs loose on the shaft K.

The screw-shafts M and M' have plain center parts $m^4$ and $m^5$, and run in upper bearings $m^6$ and $m^7$ and these bearings are carried by a cross-bar N, supported on the pillars or guides P and P', which are secured to the base F, as shown. The rams R and R' are supplied with detachable plates $r^7$ and $r^8$ to loosely fit the molding-boxes A' and A, Fig. 5, and are mounted upon the screw-shafts M and M' by means of cylindrical screw-bushes $r^2$. All these four screw-bushes $r^2$ have heads $r^3$ formed for a spanner, so that they may be operated and adjusted by hand, but ordinarily they are held tight from turning by the set-pins $r^4$, and this is their normal condition. The rams have a bored hole through them at each end to receive adjustable bushes $r^5$ to suit the pillars P and P', upon which they slide. We make the upper portion of each screw M and M' of much coarser pitch than the lower parts, so that the upper ram R moves faster than the lower one; but we do not confine ourselves to this, as they may both run at the same speed, if so desired. The upper screws have their threads cut to the opposite hand to the bottom threads, so that both rams R and R' advance to the boxes A and A' and retreat together.

The pattern-plate B rests in its normal condition, as shown at Fig. 1, upon the two spring-bushes D and D' with the two boxes A and A', one on each side, as will be clearly seen. Sand is of course supplied to the lower and upper boxes A and A' by the attendant, and both rams R and R' are brought forward by means of the driving-gear and screw-shafts so pressing the sand C upon each side of the pattern-plate, thus forming the mold, as seen at Figs. 5 and 6. The mold having been formed by the pressure of the rams on the loose sand C, we will explain the operation of separating the boxes and pattern-plate B.

The top box A' is first separated by actuating the lever L', which is fixed to the spindle $l^2$, supported from the bottom ram R', as seen at Figs. 2, 3, and 8, the motion of the lever L' being communicated to the top ram by means of the short lever $l^3$, fixed at the other end of the spindle $l^2$, and the links $l^5$, with the ropes or wires $l^7$ and $l^8$, the wires being guided over the wheels W $w'$ $w^2$ $w^3$ $w^4$ $w^5$, W and $w'$ being formed in one and turning together, as shown at Fig. 1. The ropes or wires $l^7$ are each fastened at one end to the links $l^5$ and pass upward over the pulleys $w^2$ and $w^5$, respectively, their other ends being fastened, as shown, to the pulley $w'$. The other ropes or wires, $l^8$, have one of their ends fastened to the rope-box A' and pass upward over the pulleys $w^3$ and $w^4$, their other ends being fastened to the pulley W. It will thus be clearly seen that by operating the lever L' the cords $l'$ will cause the pulley $w'$ to make half a turn and consequently the pulley W, the two being formed in one, thus causing the cords $l^8$ to lift or lower the top box A'.

The bottom box A is worked by the lever L, which is fixed to the hollow shaft $l^9$, mounted upon the spindle $l^2$ with the short lever $l^4$ and the links $l^6$. The levers L and L' work in a guide V, attached to the front of the bed F, as seen at Figs. 11 and 12, hinged stops $v'$ and $v^2$ being provided to secure the levers in position. This guide is only shown in dotted lines in Fig. 1 for convenience of illustration.

When the top box A' is lifted, the pattern-plate B rises from the bottom box A by means of the spring-bushes D and D', (shown in detail at Fig. 9,) the bushes being supported through the springs $d^2$ $d^3$ by the solid collars $m^8$, formed on or fixed to the screw-shafts M and M'. The pattern-plate is then swung out of the way of the bottom box by turning on the bush D' as a hinge, or it may be made to swing on D, if desired. The top and bottom boxes A' and A are then brought together again and the complete mold, formed of the upper and lower portions C' and C², removed from the boxes on the loose board $c^3$, as seen at Figs. 5 and 6.

For actuating the screw-shafts M and M' we mount three pulleys $k^3$, $k^4$, and $k^5$ on the horizontal shaft K, which revolve in the manner before stated, so that the driving-band E would be on the pulley $k^3$ when the rams are advancing toward one another, and on $k^5$ when the latter are receding, no motion being given to the screw-shafts M and M' when the band is on $k^4$. By the arrangement shown in Figs. 1, 2, and 3 the band E may be moved automatically from $k^3$ to $k^5$, and vice versa, to change the motion of the rams R and R' by the sliding bar S, crank $s'$, and vertical rod $s^2$, the latter having the forked part $s^3$ and moving with the bottom ram R', as seen at Figs. 2 and 3. The rod $s^2$ may be moved up and down by hand, if so desired, by leaving out the forked part $s^3$ and attaching a handle or lever thereto. As an alternative for this arrangement we may use that shown in Figs. 11 and 12, where the sliding bar S is actuated by the swinging frame T, centered at $t'$ and attached to the slotted bar $t^2$, the latter carrying the adjustable weight $t^3$. T and $t^2$ may, however, be in one piece. Moving with and attached to the bottom ram R' is the adjustable screw-pin $r^6$, which bears against the outside edge of the frame T, or we may mount a roller on the pin $r^6$ to lessen friction. In the position as shown the bottom ram R' is ready to take its downward stroke, the band E being on the loose pulley $k^4$ and the oscillating frame T being vertical. By means of the handle $s^4$, connected with the slide-bar S and worked from the front of the machine, the driving-band E is shifted onto the pulley $k^5$, which operation moves the frame T into a position with the edge $t^6$ vertical. This allows the pin $r^6$ to pass, and when the ram has finished its stroke the pin is in the position, as shown by dotted lines, Fig. 12, the weight $t^3$ having brought the frame T into its vertical position, which operation shifts the band E onto the loose pulley $k^4$. To start the ram R' on its upward stroke, the band is shifted onto $k^3$ by moving the handle $s^4$, the band again being moved onto the loose pulley at the finish of the stroke by the swinging frame, as seen in Fig. 11, and so on.

The driving-gear shown by Fig. 10 we may use as an alternative in place of the pulleys shown in Figs. 1, 2, and 3. By using cone-pulleys $k^3$, $k^4$, and $k^5$ and the conical drum $g'$ on the driving-shaft G we obtain greater power for separating the rams R and R', presuming $k^5$ to be the pulley in use when the rams are receding from one another. We may use screws of any convenient form and pitch for the shafts M and M' to obtain any desired relative motion of the rams R and R', and the screws may be cut to opposite hands, with the wheel $k^6$ working on the left-hand side of M instead of the right hand, as shown in Fig. 1. Instead of compressing the molds near the center of the machine, as illustrated in Fig. 1, we may operate them in any desired position between the cross-frame N and bed F.

We may construct the machine as illustrated in any desired or convenient proportions, and do not confine ourselves to the exact design of the different parts as shown. The pulleys $k^3$, $k^4$, and $k^5$ may be on either end of the machine; also, the levers L and L' may be arranged sufficiently close to each other to be actuated together by one hand.

What we claim, then, is—

1. In combination, the upper and lower sand-boxes, the upper and lower rams, the vertical guides for the rams and sand-boxes, means for raising and lowering the upper and lower sand-boxes, means for raising and lowering the upper and lower rams, the pattern-plate fitting between the upper and lower sand-boxes and the spring-bushes connected with and operating to raise the pattern-plate when the upper sand-box and ram are lifted, substantially as described.

2. In combination, the sand-boxes, the rams with means for operating the same, the pattern-plate fitting between the rams and the spring-bushes D, D', acting on the pattern-plate, said plate being pivotally supported to be swung aside by turning on one bushing and detachably engaging the other bushing, substantially as described.

3. In combination, the upper and lower sand-boxes, the upper and lower rams, means for raising and lowering the sand-boxes, the screw-rods for raising and lowering the rams, the pattern-plate B, and the spring-bushes for raising the same, said bushes being on the screw-rods, substantially as described.

4. In combination, the sand-boxes, the rams operating from opposite sides of the sand-boxes, the shaft $l^2$, the shaft $l^3$ thereon, and the levers L', L connected to said shafts respectively and connected to the upper and lower sand-boxes, substantially as described.

5. In combination, the sand-boxes, the upper and lower rams, the screws for operating the rams, the driving-shaft connected with the screws, the pivoted frame T, the belt-shifter S connected thereto, said frame T being arranged to control the action of the lower ram, the weight on the frame T to hold the same normally vertically and the stud $r^6$ on the lower ram to move along the side of the frame T and to rest upon the top and bottom thereof, substantially as described.

In testimony that we claim the foregoing as our own we affix our names in the presence of two witnesses.

FREDERIC WILLIAM THOMAS HARTLAND.
ARTHUR MALPAS.

Witnesses:
GEORGE LESTER,
GEORGE BARKER.